Nov. 20, 1951 P. J. GEIDL 2,575,660
EXTERNAL VISOR FOR AUTOMOBILE WINDOWS
Filed June 6, 1950
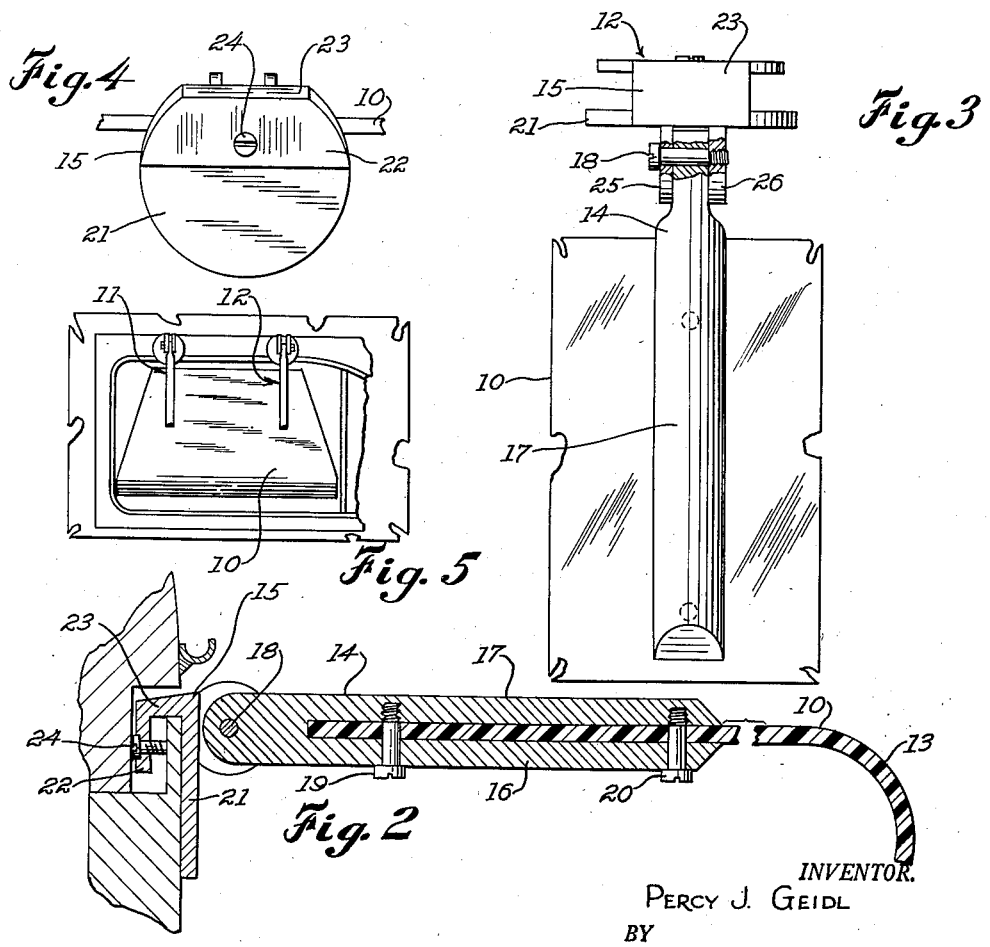
INVENTOR.
PERCY J. GEIDL
BY
McMorrow, Berman + Davidson
ATTORNEYS Patented Nov. 20, 1951

2,575,660

UNITED STATES PATENT OFFICE 2,575,660

EXTERNAL VISOR FOR AUTOMOBILE WINDOWS

Percy J. Geidl, Sioux City, Iowa

Application June 6, 1950, Serial No. 166,379

3 Claims. (Cl. 296—44)

This invention relates to external visors for automobile windows and more particularly to an adjustable visor detachably mountable on an automobile door at the top of a window opening in the door to variably shelter the upper portion of the window opening.

It is among the objects of the invention to provide an improved external visor for an automobile window which visor can be quickly and easily mounted on an existing automobile door with no modification of the door construction, which is manually adjustable to variably shelter the window opening in the door and is transparent so that it will not obstruct vision through the window opening when in lowered position, which is weather resistant and effective to remain in adjusted position against the effects of vibrational, wind and other forces, and which is strong and durable in construction, economical to manufacture, and neat and attractive in appearance.

Other objects and advantages will become apparent from a consideration of the following description and the appended claims in conjunction with the accompanying drawing wherein:

Figure 1 is a side elevational view of a fragmentary portion of an automobile showing a window visor illustrative of the invention mounted thereon;

Figure 2 is a transverse cross sectional view on an enlarged scale on the line 2—2 of Figure 1;

Figure 3 is a fragmentary top plan view particularly illustrating one of the visor supporting hinges, a portion of the hinge being broken away and shown in cross section to better illustrate the construction thereof;

Figure 4 is an end elevational view looking at the top end of the hinge as illustrated in Figure 3; and Figure 5 is an elevational view similar to Figure 1 but showing the visor in lowered position.

With continued reference to the drawing, the visor comprises a flat plate 10 of suitable transparent material, such as a synthetic resin plastic, and two hinges, generally indicated at 11 and 12, for mounting the plate 10 on an automobile door.

The plate has two straight longitudinal edges which are preferably substantially parallel to each other and is transversely curved near one edge, as indicated at 13, to provide a downwardly extending outer edge portion on the visor. The end edges of the plate may converge from the outer to the inner edge of the visor, as particularly illustrated in Figure 5, giving to the visor plate the shape of an isosceles trapezoid, the major length of which is substantially equal to the width of an automobile window opening and the width of which is approximately two thirds the length of the window opening.

As the two hinges 11 and 12 are substantially identical in construction, a detailed description and illustration of one only is considered sufficient for the purposes of the present disclosure and the hinge 12 has been selected for such detailed description and illustration and is particularly shown in Figures 2, 3 and 4.

The hinge 12 comprises an elongated arm or strap 14 and a bracket 15 pivotally secured to the arm at one end of the latter. The arm is bifurcated to provide the furcations 16 and 17 spaced apart a distance equal to the thickness of the plate 10 and the plate is received between the furcations of the arm. The arm projects beyond one edge of the plate and is provided at its projecting end with a transverse aperture which receives a pivot screw 18 for pivotally connecting the arm to the bracket 15.

The furcation 16 of the arms, normally positioned at the under side of the plate 10, is provided with two spaced apart apertures and the furcation 17, normally disposed on top of the plate 10, is provided with two tapped wells or recesses which register with the apertures in the furcation 16 but do not extend through the furcation 17. The plate 10 is provided with two apertures registering respectively with the apertures in the furcation 16 of the arm and two screws 19 and 20 extend through the registering apertures in the furcation 16 of the arm and in the plate 10 and are threaded into the tapped recesses in the furcation 17 of the arm to clamp the two furcations of the arm 14 against the opposite sides of the plate and firmly secure the plate in the bifurcated arm.

The bracket 15 has a somewhat U shaped cross section including a generally circular abutment plate 21 to be disposed at the outer side of an automobile door, a second abutment plate 22 of generally trapezoidal shape but having arcuately curved ends disposed with its ends and one edge flush with an edge of the plate 21 and spaced from the plate 21 a distance substantially equal to the thickness of the flange extending along the upper edge of a conventional automobile door. The plate 22 is connected to the plate 21 by a transverse portion 23 extending along the flattened upper edges of the two plates. The plate 22 is provided with a tapped hole and a set screw 24 is threaded through this hole to bear against the inner side of the door flange to secure the bracket onto a door.

Two lugs 25 and 26 extend in spaced apart and substantially parallel relationship from the side of the plate 21 remote from the plate 22 and are disposed substantially perpendicular to the intermediate portion 23. These lugs are provided with mutually registering apertures, the aperture in the lug 26 being screw threaded and the end of the arm 14 projecting beyond the edge of the plate 10 is reduced in width and received between the lugs 25 and 26. The pivot screw 18 extends through the registering apertures in the lug 25 and in the end of the arm 14 received between the lugs and is threaded into the tapped hole in the lug 26.

The screws 18 in the two hinges 11 and 12 can be adjustably tightened to provide the proper frictional coefficient between the arms 14 of the hinges and the lugs of the bracket to hold the visor in adjusted position against displacement by vibrational and wind forces, but to leave the hinges sufficiently free so that the visor can be manually adjusted.

The visor can be adjusted to various positions between one limiting position in which it extends upwardly from the top edge of the door and does not cover any portion of the window opening, and a position, as illustrated in Figure 5, in which it depends from the upper edge of the door and covers substantially the entire window opening.

The plate 10, while preferably transparent, is suitably colored or treated to eliminate the glare from bright sunlight so that the visor will eliminate any discomfort caused by the sun shining into a window of an automobile.

The plate 10 is formed of a weather resistant material and the hinge parts and screws are plated or otherwise treated to render them weather resistant and the arrangement by which the screws 19 and 20 do not extend through the upper surfaces of the hinge arms not only eliminates any tendency toward corrosion at the ends of these screws, but materially enhances the appearance of the visor.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An external visor for an automobile window comprising a flat piece of transparent material having a length substantially as great as the width of the window opening in an automobile door on which the visor is to be installed, bifurcated arms receiving said piece of material between the furcations thereof and disposed near respectively opposite ends of said piece of material, said arms being substantially perpendicular to one edge of said piece of material and projecting outwardly from said one edge, each of said arms having apertures in one furcation thereof and tapped recesses in the other furcation registering with said apertures and said piece of material having apertures registering with said recesses, screws extending through the apertures in said arm furcations and said piece of material and threaded into said recesses to secure said piece of material between the furcations of said arms, and brackets pivotally secured one to each of said arms at the end thereof projecting from said one edge of said piece of material for mounting said visor on an automobile door.

2. An external visor for an automatic window comprising a flat piece of transparent material having a length substantially as great as the width of the window opening in an automobile door on which the visor is to be installed, bifurcated arms receiving said piece of material between the furcations thereof and disposed near respectively opposite ends of said piece of material, said arms being substantially perpendicular to one edge of said piece of material and projecting outwardly from said one edge, each of said arms having apertures in one furcation thereof and tapped recesses in the other furcation registering with said apertures and said piece of material having apertures registering with said recesses, screws extending through the apertures in said arm furcations and said piece of material and threaded into said recesses to secure said piece of material between the furcations of said arms, and brackets pivotally secured one to each of said arms at the end thereof projecting from said one edge of said piece of material for mounting said visor on an automobile door, each of said brackets comprising a first abutment plate adapted to bear against the outer surface of the door, a second abutment plate of a width less than said first abutment plate spaced from said first abutment plate and having one edge substantially flush with an edge of the latter, an intermediate portion joining said abutment plates along said flush edges, a pair of lugs projecting in spaced apart and substantially parallel relationship from the side of said first abutment plate remote from said second abutment plate, said lugs having mutually registering apertures therein for receiving a pivot screw to pivotally connect the corresponding arm to said lugs and said second abutment plate having a tapped hole therein, and a set screw threaded through said tapped hole to secure the bracket on an automobile door.

3. A hinge for pivotally mounting a plate on a vehicle door flange comprising a bifurcated arm providing a plate receiving space between the furcations thereof, and a bracket including a first abutment plate, a second abutment plate, a pair of lugs projecting from one side of said abutment plate in spaced apart relationship and receiving one end of said arm therebetween, said lugs and said arm having registering apertures therein, a pivot screw extending through said apertures and threaded into one of said lugs for pivotally connecting said arm to said bracket and adjustably varying the friction between said arm and said lugs, said second abutment plate being spaced from the side of said first abutment plate remote from said lugs to provide a flange receiving space between said abutment plates and having a tapped hole therein, an intermediate bracket portion joining said abutment plates along corresponding edges thereof, and a set screw threaded into said tapped hole to clamp a door flange between said abutment plates.

PERCY J. GEIDL.

REFERENCES CITED

The following references are of record in the file of this patent:

UNITED STATES PATENTS

| Number | Name | Date |
| --- | --- | --- |
| 1,384,803 | Howe | July 19, 1921 |
| 1,474,727 | Naterman | Nov. 20, 1923 |
| 1,944,152 | Clark | Jan. 23, 1934 |
| 2,002,736 | Grotenhuis | May 28, 1935 |
| 2,031,404 | Biggs | Feb. 18, 1936 |
| 2,350,297 | Vesta | May 30, 1944 |